Aug. 10, 1965

M. F. CHAPPS 3,199,824

MOUNTING BRACKET

Filed April 9, 1964

INVENTOR.
MATTHEW F. CHAPPS

BY

Fowler, Knobbe & Gambrell
ATTORNEYS.

United States Patent Office 3,199,824
Patented Aug. 10, 1965

3,199,824
MOUNTING BRACKET

Matthew F. Chapps, 705A Foothill Blvd., Monrovia, Calif.

Filed Apr. 9, 1964, Ser. No. 358,601
3 Claims. (Cl. 248—289)

This invention relates to supporting structures, and more particularly to apparatus for adjustably mounting auxiliary equipment such as a television receiver on a mounting surface.

It is often desirable in providing television receivers for hospitals and hotels or portable auxiliary equipment for other uses that it be kept off the floor and out of the way. At the same time, it is helpful if the equipment can be rotated for different viewing areas in the room. In the past, it has often been the practice to use consoles or table model receivers placed on a table or a desk, so that they can be turned for viewing from different parts of the room. However, these not only take up necessary floor space, but they are often easily knocked over. Also, the equipment is to easily removed or stolen.

Not only is it desirable to provide a relatively adjustable support or mounting bracket for television sets and the like, it is equally important to provide a bracket which permits easy removal of the set for servicing and, at the same time, can be locked on its mounting bracket.

The present invention is designed to overcome many of the shortcomings of prior art support structures for such portable equipment. There is provided a simple mounting bracket rotatably supported on a mounting plate, which is affixed to a vertical wall or stud at the desired height. The mounting bracket and mounting plate cooperate in such a way that when the bracket is mounted on the mounting plate, the mounting plate can not be removed from the wall and the bracket can be locked to prevent its removal from the mounting plate.

To successfully prevent the removal of a television receiver from wall mounting apparatus of the kind presently envisioned, it is necessary to positively lock the mounting bracket on the plate in such a manner that the means securing the mounting plate to the support wall is inaccessible with the bracket in place, and to limit the space between the television receiver and the wall. The latter will make it difficult, if not impossible, for one to remove the television receiver from its supporting structure on the mounting bracket without first removing the bracket from the wall mount.

The present invention is designed to meet these multifold requirements. A mounting plate is provided which has vertical support means for the bracket affixed to it at spaced-apart points. It is apertured immediately beneath the support means to secure it to a wall or stud. This permits the bracket, when in place, to cover the apertures that permit the mounting plate to be supported on the wall, which arrangement prevents removal of the plate until the bracket itself is removed from the plate.

In the exemplary embodiment of the present invention, the mounting bracket includes a pin which depends through an apertured shoulder of the support means and is apertured to receive a lock that blocks withdrawal of the rod from the shoulder.

The lower or support legs of the mounting bracket form a support surface for the auxiliary equipment. The depth of the support legs is proportioned in accordance with the particular television receiver to be used so that the back of the television receiver is relatively close to the mounting plate and its supporting surface. The television receiver normally will be bolted to the support surface or platform so that it is difficult to remove the receiver from the supporting platform until the back of the television receiver is removed. Since the back cannot be removed until the bracket is removed from the mouting plate, a safe and substantially fool-proof system is provided for preventing a television receiver from being carried off when not under surveillance.

Variations in the vertical orientation of the television receiver or auxiliary equipment can be obtained by bending the lower legs of the bracket a little above or below the horizontal to provide a few degress of tilt to the front face of the receiver. This will make it useful when the television receiver is to be mounted relatively high on a wall.

From the foregoing it can be appreciated that the principal object of this invention is to provide a simple and sturdy bracket for supporting a television receiver or other auxiliary equipment on a supporting surface so that it can be rotated in a horizontal plane, adjusted in a vertical plane and easily removed for servicing and for transporting to other parts of a room, hospital, hotel or other area.

These and other objects, advantages and features of the present invention may be more fully understood when the following detailed description is read with reference to the drawing in which.

Figures 1, 2, 3, 4:
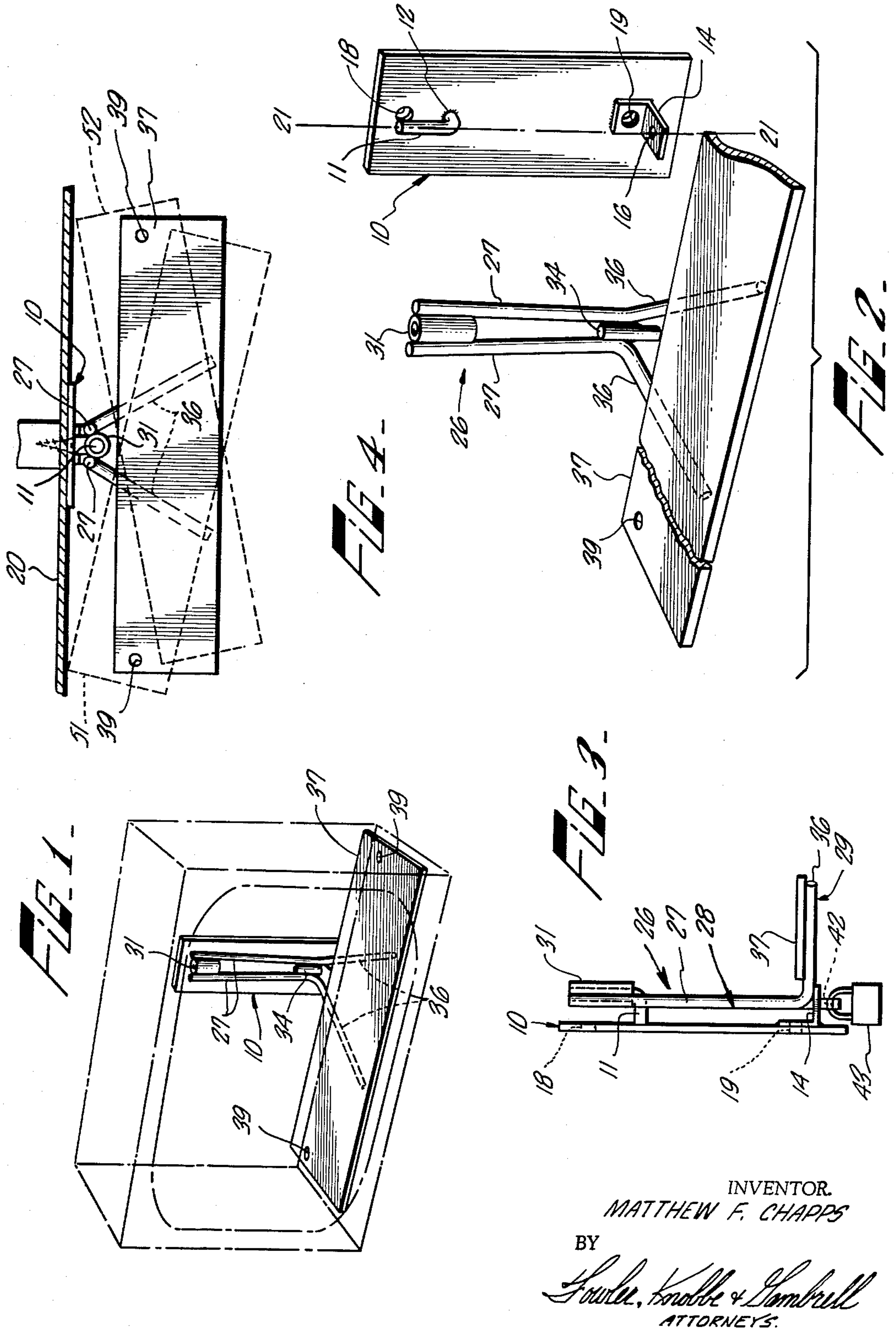
FIG. 1 is a perspective view of the present invention for mounting auxiliary equipment with an exemplary television receiver shown by dashed lines.
FIG. 2 is an enlarged perspective of the mounting bracket and mounting plate forming the present invention, separated to illustrate the particular parts thereof.
FIG. 3 is a side view of the assembled apparatus of the present invention.
FIG. 4 is a plan view of the apparatus of the present invention with the supporting platform shown at its two extreme limits of rotation by dotted lines.

The mounting plate 10 is generally rectangular in shape and has a rod 11 bent into an L-shape affixed at its lower end 12 to an upper part of the plate 10. The rod 11 is affixed to the front surface of the mounting plate 10 by welding or bolting, and the long leg of the rod 11 extends vertically upward as illustrated.

At the lower part of the mounting plate 10 there is provided an L-shaped mounting bracket 14 having a projection or shoulder extending outwardly from the mounting plate surface and having an aperture 16 formed therethrough. The bracket 14 is exemplarily welded to the plate 10.

The mounting plate 10 is adapted to be secured to a supporting surface or stud 20 by way of a pair of apertures 18 and 19. It will be noted that apertures 18 and 19 lie directly behind the axis of rotation 21 drawn through the center of rod 11 and aperture 16. This axis 21 defines the rotation of the mounting bracket 26.

The mounting bracket 26 is generally L-shaped and, in the exemplary embodiment, is formed by a pair of rods bent at approximately right angles to form the upper bifurcated leg 28 (rods 27) of the bracket and the lower bifurcated leg 29 (rods 36). A hollow sleeve or ferrule 31 is affixed between the upper ends of the vertical leg 28, e.g. by welding, with the longitudinal axis of the sleeve 31 disposed vertically. A vertically oriented pin 34 aligned with the longitudinal axis of sleeve 31 is affixed between the legs 28 and 29, e.g. by welding, at the lower part of the bracket. The leg 29 is bifurcated to provide support members 36 to which are attached the support platform 37. The support platform 37 is apertured, such at 39, to provide means for affixing auxiliary equipment thereto.

When the bracket 26 is mounted on plate 10, the rod 11 telescopes into the ferrule 31 and the lower part of pin 34 depends through aperture 16. It will be observed that, in situ, the mounting bracket 26 covers apertures 18 and 19 which are used to screw or bolt the plate 10 to the support surface 20. This prevents easy removal of the mounting plate 10 from the supporting surface 20 until the bracket 26 is removed.

The lower end of pin 34 has an aperture 42 formed therethrough, which is located below the bottom of the shoulder of member 14 when the mounting bracket 26 is rotatably supported on the mounting plate 10. A lock, such as 43, can be inserted through the aperture 42 to prevent the removal of the bracket 26 from the mounting plate 10.

It is also apparent, particularly from looking at FIG. 3, that the vertical length of the sleeve 31 with respect to its supporting rod 11 is such that it will continue to confine the bracket 26 until the pin 34 moves out of the aperture 16. Thus, there will be no possibility of removing the bracket 26 from the mounting plate unless the lock 43 is first removed from the lower part of the pin 34.

It will also be observed, particularly with respect to FIG. 4, that the limit of rotation of the mounting bracket 26 and supporting platform 37 thereon is limited between the dotted line positions designated 51 and 52. The actual angle or degrees of rotation of the bracket with respect to the mounting plate 10 and the supporting surface 20 depends upon the relative positioning and size of the supporting platform 37. A large supporting platform 37' is also shown by dot and dash line in FIG. 4.

The television receiver will normally be connected to the platform 37 by way of apertures 39 in a way which requires the back of the receiver to be removed. The reason for this is explained hereinafter.

The exact size of the platform 37 and the degree of rotation permitted will be governed by the particular TV receiver to be used with the mounting bracket and the degree of rotation desired. In all cases, however, it is desirable that the supporting platform 37 act as a stop for the rotation of the mounting bracket 26 between its extreme position to avoid contacting the wall with the receiver itself.

The support platform 37 is also kept sufficiently close to the supporting surface 20 to make it difficult to remove the back of the television receiver with the set and bracket 26 in place. In this way, since the back of the receiver must be removed to disconnect the set from platform 37, it prevents unauthorized removal.

No particular means for connecting the supporting platform 37 to the members 36 is shown, and it may be desirable to extend the screws that hold the television receiver to the support platform into members 36 as well. In all events, it is desirable that the television receiver not be removable from the platform 37 until its bracket 26 is removed from the mounting plate 10 to provide access to the interior of the television receiver.

It may also be desirable not to use a supporting platform 37 but to affix the television receiver or other auxiliary equipment directly to the bifurcated members 36.

It can be seen, particularly with respect to FIG. 3, that the lower or horizontal leg 29 can be bent above or below the horizontal a few degrees to tilt the forward or viewing surface of the TV picture tube, depending upon the relative position of the mounting plate on the supporting surface and individual preferences.

In operation and use, a plate 10 would be affixed to a wall at a desired location, and a television receiver would be mounted on supporting platform 37 and the horizontal leg of the bracket 26 so that a pre-selected rotation to the left and right of center, positions illustrated in FIG. 4 as 51 and 52, was possible before the support platform contacted the supporting surface 20. With the television receiver affixed to the supporting platform 37, the mounting bracket 26 would be principally supported on rod 11 for rotation about axis 21 with aperture 16 acting primarily as a guide. It is also possible to provide a plurality of mounting plates at various places in the hospital, hotel or other place of use so that one or more television receivers can be moved from time to time from one place to another.

A lock 43 or other device would be used to prevent the pin 34 from moving out of the aperture 16 so that the television receiver could not be removed without the mounting bracket 26.

With the television receiver thus disposed, it could be used until it is desired to remove it for servicing or to place it in another location, at which time the lock 43 would be removed and the entire bracket 26 and television receiver taken down. Thereafter, the television receiver and its supporting bracket could be replaced on the mounting plate 10.

While the invention has been described with respect to a preferred embodiment, and particularly with reference to television receivers used in hotels or hospitals, it should be obvious to those skilled in the art that other uses and certain other arrangements may be envisioned without departing from the spirit and scope of the invention. For this reason the invention should be limited only to the extent of the appended claims.

What is claimed is:

1. Apparatus for mounting auxiliary equipment such as television receivers and the like comprising, in combination,
   - a mounting plate;
   - means to attach said plate to a support surface;
   - support means affixed to said plate including a rod spaced apart from the surface of said plate and a spaced-apart, apertured projection in vertical alignment therewith;
   - an L-shaped bracket having a spaced apart sleeve and pin affixed to one arm thereof to support said bracket on said rod and interior of said aperture, respectively, for rotation with respect thereto; and,
   - means including the other arm of said bracket to support auxiliary equipment.

2. Apparatus for mounting auxiliary equipment such as television receivers and the like in accordance with claim 1 wherein
   - said support bracket means and said one arm cover said plate attaching means to prevent removal of said plate so long as said bracket is rotatably supported on the plate,
   - said other arm is bifurcated to provide spread apart support members for the auxiliary equipment, and
   - said support members are bendable in a vertical plane to permit the front of the auxiliary equipment to be adjustably tilted for ease of viewing depending upon the mounting height of the apparatus.

3. Apparatus for mounting auxiliary equipment such as television receivers and the like in accordance with claim 2 wherein
   - said support means for the auxiliary equipment includes a platform attached thereto and said support bracket and platform are proportioned to limit the rotation of said bracket with respect to the supporting surface, and including
   - means cooperating with the pin of the bracket support means to lock the bracket on the mounting plate.

References Cited by the Examiner

UNITED STATES PATENTS

| | | | |
|---|---|---|---|
| 342,476 | 5/86 | Swartwout | 248—289 |
| 2,469,981 | 5/49 | Nelson | 248—289 |
| 2,648,761 | 8/53 | Shamel | 240—2 |
| 2,986,366 | 5/61 | Wesson | 248—289 |
| 3,096,062 | 7/63 | Bosshart | 248—289 |

CLAUDE A. LE ROY, *Primary Examiner.*